(12) United States Patent
Eng et al.

(10) Patent No.: US 7,755,787 B2
(45) Date of Patent: Jul. 13, 2010

(54) METHOD AND SYSTEM FOR MANAGING SHARED PRINTERS

(75) Inventors: Yaag Whuang Eng, Singapore (SG); Yuchun Lu, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 1475 days.

(21) Appl. No.: 11/119,238

(22) Filed: Apr. 29, 2005

(65) Prior Publication Data

US 2006/0244990 A1 Nov. 2, 2006

(51) Int. Cl.
G06F 3/12 (2006.01)
G06K 15/00 (2006.01)
G06F 3/00 (2006.01)

(52) U.S. Cl. .................... 358/1.15; 358/1.16; 710/8; 710/9; 710/10; 710/62; 711/170

(58) Field of Classification Search .................. 358/1.1, 358/1.15; 709/222, 228; 710/5–18, 62; 713/1
See application file for complete search history.

(56) References Cited

U.S. PATENT DOCUMENTS

| | | | | |
|---|---|---|---|---|
| 4,773,005 A | * | 9/1988 | Sullivan | 710/9 |
| 6,490,637 B1 | * | 12/2002 | Shih | 710/8 |
| 6,615,285 B1 | * | 9/2003 | Schafranek et al. | 710/3 |
| 6,697,073 B1 | * | 2/2004 | Kadota | 345/501 |
| 6,792,479 B2 | * | 9/2004 | Allen et al. | 710/10 |
| 6,804,727 B1 | * | 10/2004 | Rademacher | 710/9 |
| 6,931,456 B2 | * | 8/2005 | Payne et al. | 710/9 |
| 7,003,589 B2 | * | 2/2006 | Erickson et al. | 710/8 |
| 7,234,061 B1 | * | 6/2007 | Diab et al. | 713/176 |
| 7,447,790 B2 | * | 11/2008 | Motoyama et al. | 709/230 |
| 2002/0144024 A1 | * | 10/2002 | Kumpf et al. | 710/12 |
| 2002/0174283 A1 | * | 11/2002 | Lin | 711/1 |
| 2003/0063305 A1 | | 4/2003 | McIntyre | |
| 2003/0195917 A1 | | 10/2003 | Horiyama et al. | |
| 2003/0233499 A1 | * | 12/2003 | Choi | 710/36 |
| 2004/0024916 A1 | * | 2/2004 | Hsing | 710/1 |
| 2004/0093491 A1 | | 5/2004 | Ebata | |
| 2005/0055471 A1 | * | 3/2005 | Payne et al. | 710/5 |
| 2005/0144275 A1 | * | 6/2005 | Shima | 709/224 |
| 2006/0043166 A1 | * | 3/2006 | Matsumoto et al. | 235/376 |
| 2006/0092290 A1 | * | 5/2006 | Demeo et al. | 348/231.99 |
| 2006/0192999 A1 | * | 8/2006 | Kawai | 358/1.15 |
| 2008/0123114 A1 | * | 5/2008 | Hirosugi et al. | 358/1.1 |

FOREIGN PATENT DOCUMENTS

| | | |
|---|---|---|
| EP | 1457873 | 9/2004 |
| WO | WO 99/61994 | 12/1999 |
| WO | WO 2004/056047 | 7/2004 |
| WO | WO 2004/111960 | 12/2004 |

* cited by examiner

Primary Examiner—Twyler L Haskins
Assistant Examiner—Dennis Dicker (57) ABSTRACT

A method for managing a plurality of printers shared among at least one user is provided. At least two of the plurality of printers are of the same model. The method includes configuring the at least two of the plurality of printers to report a common serial number by setting a serial number flag in a memory unit of the printer to a predefined value. When a computer is connected to the printer, the printer reports the common serial number to the computer.

19 Claims, 5 Drawing Sheets

Module _sm_suppress_serial_num

```
static void _sm_suppress_serial_num(void *this, char *command)
{
    int state;

state = UDW_IFC_CALL(get_int)(UDW_IFC);
        if (state == 1)
        DS2_IFC_CALL(set_sim_ob)(DS2_IFC,
DSID_PNP_SUPPRESS_SERIAL_NUMBER, 1);
        else if (state == 0)
        DS2_IFC_CALL(set_sim_ob)(DS2_IFC,
DSID_PNP_SUPPRESS_SERIAL_NUMBER, 0);
}
```

FIG 4

Activation Command

```
%-12345X@PJL ENTER LANGUAGE=PCL3GUI
E%Psm.suppress_serial_num 1;
udw.quit;*rCE%-12345X
```

FIG 5

Modified firmware

```
case GET_DESCRIPTOR:
/* the host is requesting the device descriptor*/
 switch DESC_TYPE:
   case STRING_DESCRIPTOR:
     switch DESC_INDEX:
       case SERIAL_INDEX: /*under this index, host is requesting
serial number*/
         /* Get serial number string from data store in NVRam*/
         if (USB_DS2_IFC_CALL(get_sim_ob)(USB_DS2_IFC,
                                        DSID_PNP_SUPPRESS_SERIAL_NUMBER) ==
0)
         {
             _set_string( port, Usb_serial_number,
Usb_num_bytes_serial_number );
         }
         else {
             _set_string( port, _sm_default_serial_number,
SIZE_SERIAL_NUMBER);
                 }
       break;
```

Deactivation Command

```
%-12345X@PJL ENTER LANGUAGE=PCL3GUI
E%Psm.suppress_serial_num 0;
udw.quit;*rCE%-12345X
```

FIG 9

METHOD AND SYSTEM FOR MANAGING SHARED PRINTERS

FIELD OF THE INVENTION

The invention relates generally to printers, and more particularly to a method and system for managing shared printers.

BACKGROUND OF THE INVENTION

When a device is connected to a computer, the computer needs to learn about the device to determine some characteristic features of the device. Some examples of the characteristic features of the device include the device type, data speed it can support, the vendor name, model number and release number. After learning about the device, the computer assigns a device driver before any computer applications can communicate with the device. This initial exchange of information between the computer and the device is called enumeration.

When a printer is connected to the computer, for example via a Universal Serial Bus (USB), the printer provides its model name and serial number to the computer. The computer checks whether a logical port has been created for the printer based on the provided model name and serial number. If no logical port has been created, the computer creates one accordingly. Subsequently, the computer loads and assigns a printer driver to the created logical port for the printer.

Fleet managed mobile printing is a usage model where a group of printers is centrally managed and shared among a group of users. This group of centrally managed printers usually includes mobile printers having the same model name but different serial numbers. In fleet managed mobile printing, a user connects his computer to any one of the centrally managed printers when he needs to print a document, and disconnects the printer from his computer after printing.

When a printer having a different serial number is connected to the computer, the computer creates a new logical port for the printer with a new instance of the printer driver pointing to it. Therefore in fleet managed mobile printing, if the user uses ten of the centrally managed printers (all having different serial numbers) for printing, there will be ten different logical ports being created in the user's computer even though all the printers are of the same model. These additional logical ports are unnecessary and take up computer resources.

If many ports are created in the computer, it is not easy for the user of the computer to determine the correct port to be used for the current printer. The user may run a software utility program to detect the port which is currently active as the port being used by the current printer. However, this still does not solve the problem of creating many unnecessary ports in the computer.

It is also possible to manufacture printers having both the same model name and serial number. In this case, only one logical port would be created for all the centrally managed printers since all the printers have the same model name and serial number. However, having the same serial number for all the printers will cause inventory tracking problems. It will also prevent some manufacturing and servicing tools from working properly.

SUMMARY OF THE INVENTION

In an embodiment, a method for managing a plurality of printers shared among at least one user is provided. At least two of the plurality of printers are of the same model. The method includes configuring the at least two of the plurality of printers to report a common serial number by setting a serial number flag in a memory unit of the printer to a predefined value. When a computer is connected to the printer, the printer reports the common serial number to the computer.

BRIEF DESCRIPTION OF THE DRAWINGS

The embodiments of the invention will be better understood in view of the following drawings and the detailed description.

DETAILED DESCRIPTION OF THE INVENTION

Figure 1:
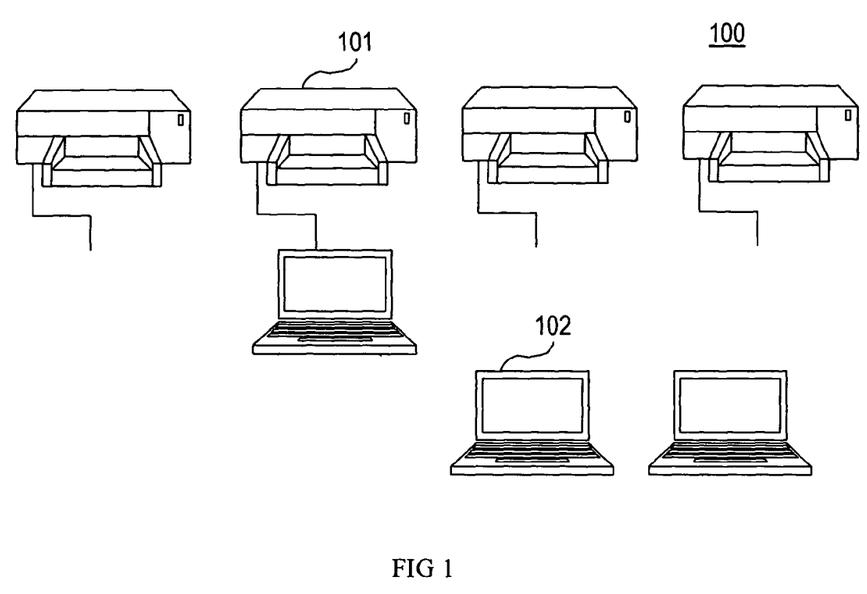
FIG. 1 shows a fleet managed mobile printing system including five printers shared by three users.

FIG. 1 shows a fleet managed mobile printing system 100 in which four printers 101 are shared among three users, with each user using one computer 102. It should be rioted that although four printers 101 and three computers 102 (or users) are shown in FIG. 1, they are only for illustrative purposes. The fleet managed mobile printing system 100 can include any number of printers 101 and users.

In the fleet managed mobile printing system 100, two or more printers may be of the same model. For illustrative purposes, it is assumed that all the printers 101 shown in FIG. 1 are of the same model, but have different serial numbers. Each computer 102 may connect to any of the printers 101 for a printing operation. Normally, the computer is disconnected from the printer 101 after the printing operation.

Figure 2:
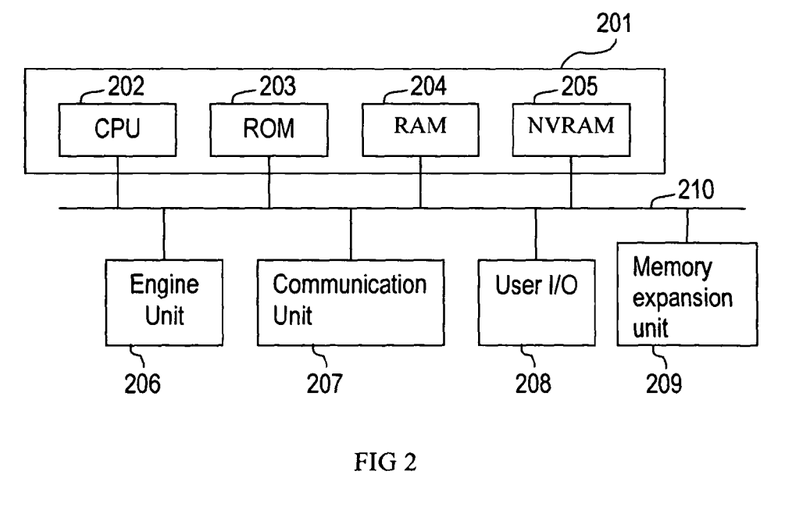
FIG. 2 shows a block diagram of a printer.

FIG. 2 is a block diagram showing an example of construction of a printer 101. A controller unit 201 controls the function of the entire printer 101. The controller unit 201 includes a Central Processing Unit (CPU) 202, a Read-Only Memory (ROM) 203, a Random Access Memory (RAM) and a Non-Volatile RAM (NVRAM) 205. The CPU 202 executes instructions and controls the controller unit 201. The ROM 203 stores information such as system boot programs. The RAM 204 is a temporary storage area used for storing any kind of information. Usually operating systems and programs for communication control are loaded in the RAM 204 to be executed by the CPU 202. The information stored in the RAM 204 is erased once the printer 101 is powered down. The NVRAM 205 is also a storage area similar to the RAM 204. However, the information stored in the NVRAM 205 is not erased when the printer 101 is powered down.

An engine unit 206 performs mechanical operations of the printer 101 such as the printing operation. A communication unit 207 controls the communication between the printer 101 and a computing unit such as the user computer 102 or a computer server. The communication unit 207 may connect to the computing unit using a Universal Serial Bus (USB) port, a parallel port or a serial port. A user operation I/O unit 208 allows a user to interact with the printer, for example, to modify the printer settings of a print job.

The printer 101 may also include a memory expansion unit 209. The memory expansion slot 209 allows the user to add external memory to the printer 101. The external memory may be in a form of a memory card, including but not limited to, Compact Flash (CF) I and II, Secure Digital (SD), SONY Memory Stick, Multimedia Card (MMC), xD Card and SmartMedia. In this case, the memory expansion unit 209 is a memory card reader for receiving any of the above-mentioned memory cards. The memory expansion unit 209 may also be a USB port for receiving a USB thumb drive. A system bus 210 provides a communication path among the functional blocks of the printer 101.

Figure 3:
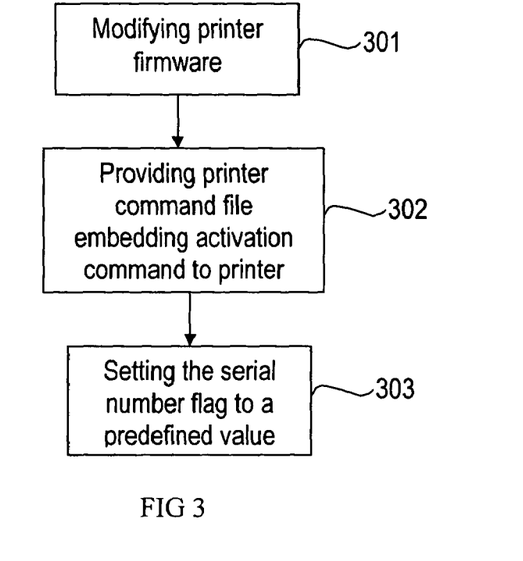
FIG. 3 shows a flow chart of an activation process for configuring a printer to report a common serial number according to an embodiment.

FIG. 3 shows a flow chart of an activation process for configuring a printer to report a common serial number according to an embodiment. In this embodiment, the activation process is performed on all the printers 101 in the fleet managed mobile printing system 100 to configure them to report the common serial number.

Figure 4:
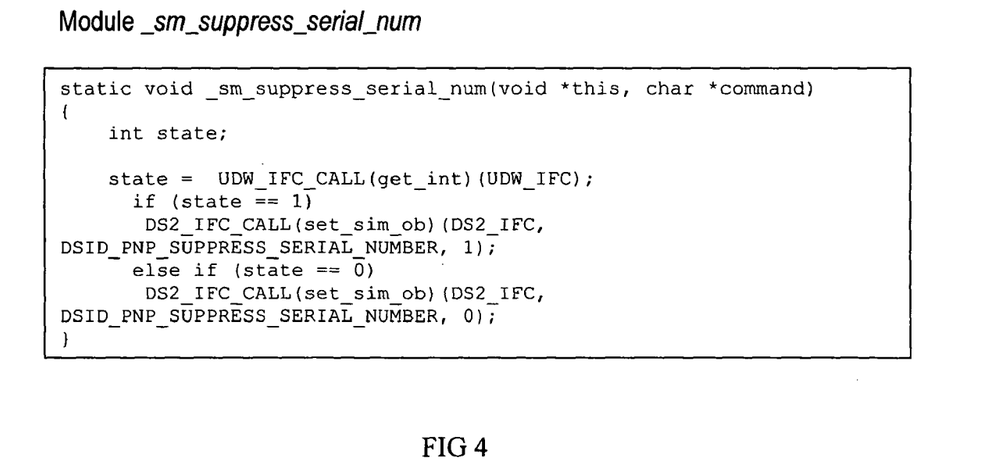
FIG. 4 shows an example of a module added to a printer firmware to determine a value of sm.suppress_serial_num provided in an activation commend embedded in a printer command file according to an embodiment.

Step 301 includes modifying at least a portion of a firmware of the printer 101 to enable the printer 101 to process a printer command file. The modified firmware is stored in the ROM 203, and causes the printer 101 to automatically process a printer command file when the printer command file is provided to the printer 101. FIG. 4 shows an example of a module _sm_suppress_serial_num which has been added to the firmware of the printer according to an embodiment. The added module determines a value of sm.suppress_serial_num provided in an activation command embedded in the printer command file.

Figure 5:
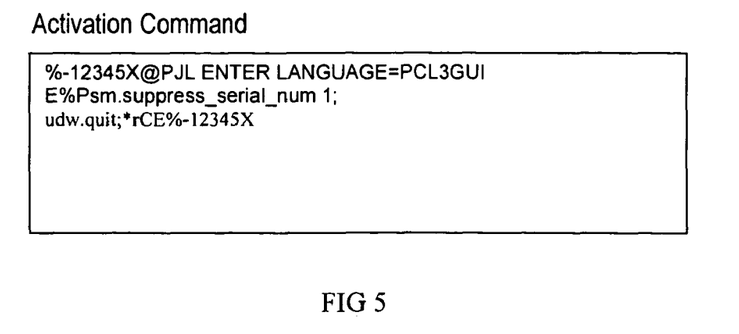
FIG. 5 shows an example of the activation command for setting a serial number flag in the NVRAM of the printer to a predefined value according to an embodiment.

Step 302 includes providing a printer command file to the printer 101. The printer command file includes an activation command for setting a serial number flag in a memory unit of the printer 101 to a predefined value, for example to the value x0000000010. The printer command file embedding the activation command may be a Printer Command Language (PCL) file, a Printer Job Language (PJL) file or a Printer Management Language (PML) file, all of which are proprietary to the Hewlett-Packard Company. The activation command may also be embedded in other printer command files, including but not limited to, Canon BJL Commands and Epson ESC P/2. FIG. 5 shows an example of an activation command embedded in a PCL file. The serial number flag is set to the predefined value by setting the field "sm.suppress_serial_num" to "1".

Alternatively, the printer command file may be provided to the printer 101 by storing the file in a memory card, and inserting the memory card into the memory card unit_209 of the printer 101 in one embodiment. Examples of the memory cards for storing the printer command file include, but not limited to, Compact Flash (CF) I and II, Secure Digital (SD), SONY Memory Stick, Multimedia Card (MMC), xD Card and SmartMedia. In another embodiment, the printer command file is stored in a USB thumb drive, and provide it to the printer 101 by inserting the USB thumb drive into a corresponding USB slot of the printer 101.

Figure 6:
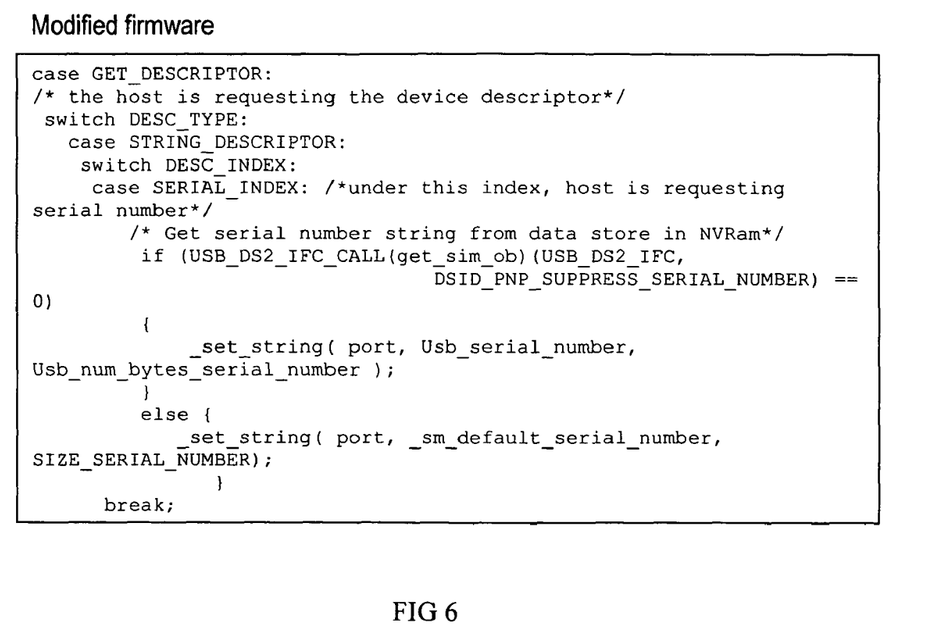
FIG. 6 shows an example of a portion of the printer firmware which has been modified to provide either the actual serial number of the printer or the predefined serial number based on the value of the NVRAM according to an embodiment.

Step 303 includes setting the serial number flag provided in a memory unit of the printer 101 to a predefined value. In an embodiment, the serial number flag is provided in the NVRAM 205 of the printer 101. After the serial number flag has been set to the predefined value, the printer outputs a predefined serial number to any of the computers 102 when any of the computers 102 is connected to the printer 101. When all the printers 101 have been configured by setting their respective serial number flag to the predefined value, all the printers will output the predefined serial number, that is, a common serial number. FIG. 6 shows a portion of the printer firmware which has been modified to provide either the actual serial number of the printer or the predefined serial number based on the value of the NVRAM.

Accordingly, after setting the serial number flag in the NVRAM 205 to the predefined value, the serial number flag will retain the predefined value even when the power of the printer 101 is turned off. When the printer 101 is powered on again, it will still retain the predefined value in the serial number flag and output the common serial number.

In an alternative embodiment, the serial number flag of the NVRAM 205 may be set to the predefined number by inputting a predefined key sequence through the user operation I/O unit 208 of the printer 101. The user operation I/O unit 208 may be provided on the printer as a user input panel.

Figure 7:
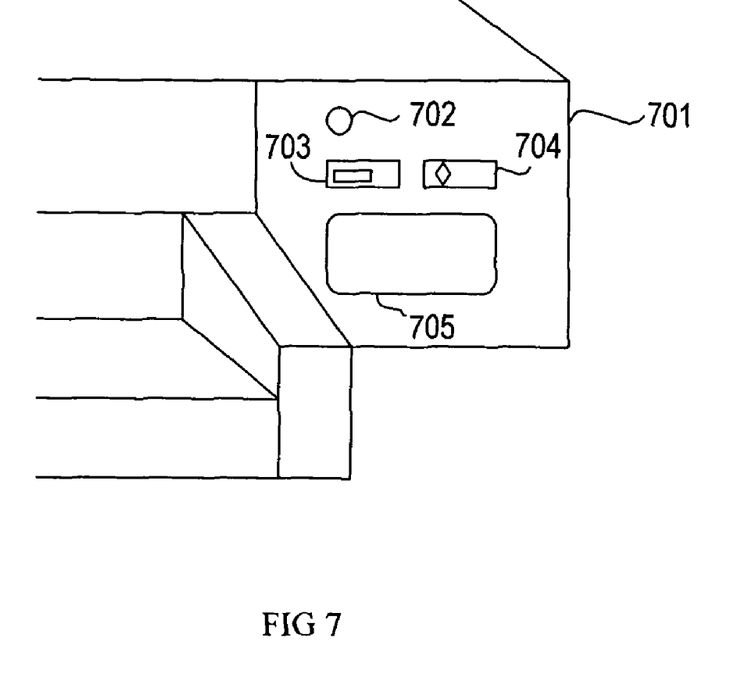
FIG. 7 shows an example of a user input panel of the printer.

FIG. 7 shows an example of a user input panel 701 on a front panel of a printer. The user input panel 701 includes a selector or function button 702, a CANCEL button 703, a form-feed button 704 and a display 705. A particular key or tap sequence may be defined as the activation command for setting the serial number flag of the NVRAM 205 to the predefined value. For example, the CANCEL button 703 may be assigned a number "10" and the form-feed button 704 is assigned a number "1". A key or tap sequence of 33 (tap 33) may be assigned as the activation command, and is entered by pressing and holding the selector button 702, and sequentially pressing the CANCEL button 703 three times followed by the form-feed button 704 three times. The display 705 may display a confirmation message that the activation command has been entered.

It is also possible to provide the user input panel 701 with different types and arrangement of buttons in other embodiments. In one embodiment, a keypad may be provided for entering the key sequence for setting the serial number flag of the NVRAM 205 to the predefined value.

Figure 8:
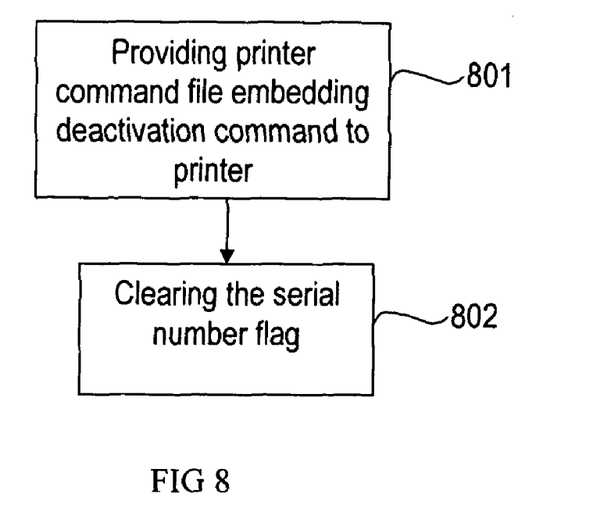
FIG. 8 shows a flow chart of a deactivation process for clearing the serial number flag so that the printer reports its actual serial number according to an embodiment.

FIG. 8 shows a flow chart of a deactivation process for clearing the serial number flag in the memory unit of the printer so that the printer reports its actual serial number according to an embodiment. The deactivation process may be used on the printers which are no longer being used in the fleet managed mobile printing system 100, so that these printers report their actual serial numbers instead of the common serial number.

Figure 9:
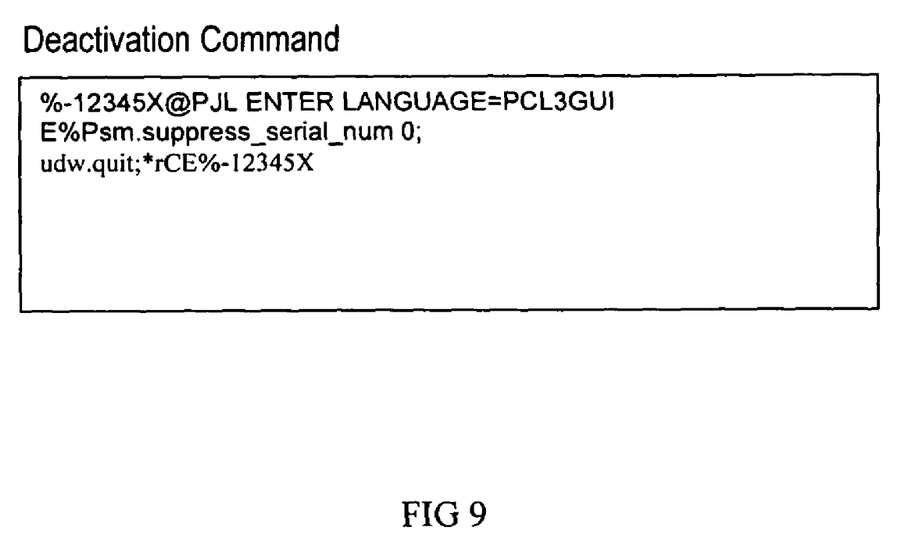
FIG. 9 shows an example of a deactivation command for clearing the serial number flag in the NVRAM of the printer according to an embodiment.

Step 801 includes providing a printer command file to the printer 101. The printer command file includes a deactivation command for clearing the serial number flag in the memory unit of the printer 101. Similarly, the printer command file embedding the deactivation command may be a PCL file, PJL file or PML file. The deactivation command may also be embedded in other printer command files, including but not limited to, Canon BJL Commands and Epson ESC P/2. FIG. 9 shows an example of a deactivation command embedded in a PCL file. The serial number flag is cleared by setting the field "sm.suppress_serial_num" to "0".

The printer command file embedding the deactivation command may also be provided to the printer 101 by storing the file in a memory card, and inserting the memory card into the memory card unit 209 of the printer 101 in one embodiment. Examples of the memory card for storing the printer command file include, but not limited to, Compact Flash (CF) I and II, Secure Digital (SD), SONY Memory Stick, Multimedia Card (MMC), xD Card and SmartMedia. It is also possible to store the printer command file in a USB thumb drive, and provide it to the printer 101 by inserting the USB thumb drive into a corresponding USB slot of the printer 101 in another embodiment.

Step 802 includes clearing the serial number flag in the memory unit of the printer 101. After the serial number flag has been cleared, or by setting it to the value x0000000000, the printer outputs its actual serial number to any computers 102 which are connected to it.

The serial number flag of the NVRAM 205 may also be cleared by inputting a predefined key sequence using the user input panel 701 on the printer 101. A particular key sequence may be defined as the deactivation command for clearing the serial number flag of the NVRAM 205. For example, a key sequence of 34 (tap 34) may be assigned as the deactivation command, and is entered by pressing and holding the selector button 702, and sequentially pressing the CANCEL button 703 three times followed by the form-feed button 704 four times. The display 705 may also display a confirmation message that the deactivation command has been entered.

It should be noted that when the printer 101 has been deactivated so that it reports its actual serial number, it can be re-activated again to report the common serial number. In this case, the activation process includes only step 302 and step 303. There is no need to modify the firmware of the printer again.

The embodiments described above therefore allows a user to create only one port in his computer for printing even when he prints using any of the printer 101 in the fleet managed mobile printing system 100. Thus, the creation of many unnecessary logical ports for printing in the fleet managed mobile printing system 100 can be avoided.

Although the present invention has been described in accordance with the embodiments as shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing a plurality of printers shared among a plurality of users, wherein at least two of the plurality of printers are of a same model, the method comprising:
    configuring a memory unit of each of the at least two of the plurality of printers to report a common serial number by setting a serial number flag in a memory unit of a printer to a predefined value, such that when a computer is connected to the printer, the printer reports the common serial number to the computer;
    modifying a firmware of the printer to enable the printer to process a printer command file; and
    providing the printer command file to the printer, wherein the printer command file includes an activation command for setting the serial number flag in the memory unit to the predefined value, and wherein an actual serial number of each of the at least two of the plurality of printers is suppressed.

2. The method of claim 1, wherein the printer command file is stored in a data storage receiving unit of the printer.

3. The method of claim 1, wherein the configuring of each of the at least two plurality of printers further comprises:
    inputting a predefined key sequence on a user input panel of the printer, wherein the predefined key sequence corresponds to an activation command for setting the serial number flag in the memory unit of the printer to the predefined value.

4. The method of claim 1, further comprising clearing the serial flag in the memory unit of the printer, such that the printer reports its actual serial number to the computer when connected thereto.

5. A printer comprising a memory unit including firmware configured to enable the printer to process a printer command file stored in a data storage device connected to the memory unit of the printer and which is configurable to report predefined serial number to a computer connected thereto by setting a serial number flag in the memory unit of the printer to a predefined value, wherein the printer is one of a plurality of printers of a same type connected to the computer, wherein each of the printers reports the same predefined serial number to the computer, wherein the printer command file includes an activation command for setting the serial number flag in the memory unit to the predefined value and wherein an actual serial number to the printer is suppressed.

6. The printer of claim 5 further comprising a data storage receiving unit,
    wherein the printer command file is stored in a data storage device which is connected to the data storage receiving unit of the printer, and
    wherein the printer command file includes an activation command for setting the serial number flag in the memory unit of the printer to the predefined value and suppressing an actual serial number of the printer.

7. The printer of claim 6, wherein the data storage receiving unit is a Universal Serial Bus (USB) port adapted to receive a USB thumb drive.

8. The printer of claim 6, wherein the data storage receiving unit is a memory card slot adapted to receive at least one of the following data storage devices;
    a) Compact Flash I and II;
    b) SONY Memory Stick;
    c) Secure Digital;
    d) Multimedia Card;
    e) xD Card; and
    f) SmartMedia.

9. The printer of claim 5, wherein the memory unit of the printer is a Non-Volatile Random Access Memory (NVRAM).

10. The printer of claim 5 further comprising a user input panel, wherein the user input panel allows a user to input a predefined key sequence which corresponds to an activation command for setting the serial number flag in the memory unit of the printer to the predefined value.

11. The printer of claim 5, wherein the firmware is further programmed to report the printer's actual serial number by clearing the serial number flag in the memory unit.

12. A mobile printing system comprising:
    at least one computer; and
    a plurality of printers;
    wherein at least two of the plurality of printers are of a same model and wherein each printer is configurable to report a common serial number to the at least one computer when connected thereto by setting a serial number flag in a memory unit of the printer to a predefined value;
    wherein a firmware of the printer has been modified to process a printer command file stored in the data storage device which is connected to the data storage receiving unit of the printer, and wherein the printer command file includes an activation command for setting the serial number flag in the memory unit to the predefined value and wherein an actual serial number of the printer is suppressed.

13. The mobile printing system of claim 12, wherein each of the at least two of the plurality of printers comprises a data storage receiving unit.

14. The mobile printing system of claim 13, wherein the data storage receiving unit is a Universal Serial Bus (USB) port adapted to receive a USB thumb drive.

15. The mobile printing system of claim 13, wherein the data storage receiving unit is a memory card slot adapted to receive at least one of the following data storage devices;
   a) Compact Flash I and II;
   b) SONY Memory Stick;
   c) Secure Digital;
   d) Multimedia Card;
   e) xD Card; and
   f) SmartMedia.

16. The mobile printing system of claim 12, wherein the memory unit of each of the at least two of the plurality of printers is a Non-Volatile Random Access Memory (NVRAM).

17. The mobile printing system of claim 12, wherein each of the plurality of printers comprises a user input panel which allows a user to input a predefined key sequence, and wherein the predefined key sequence corresponds to an activation command for setting the serial number flag in the memory unit of the printer to the predefined value.

18. The mobile printing system of claim 12, wherein the printer is further configurable to report its actual serial number by clearing the serial number flag in the memory unit.

19. A computer readable medium having stored thereon one or more sequences of instructions for causing one or more processors to perform the method for managing a plurality of printers shared among a plurality of users, wherein at least two of the plurality of printers are of a same model, the method comprising:
   configuring a memory unit of each of the at least two of the plurality of printers to report a common serial number by setting a serial number flag in a memory unit of a printer to a predefined value, such that when a computer is connected to the printer, the printer reports the common serial number to the computer and suppressing an actual serial number of each of the at least two of the plurality of printers;
   modifying a firmware of the printer to enable the printer to process a printer command file; and
   providing the printer command file to the printer, wherein the printer command file includes an activation command for setting the serial number flag in the memory unit to the predefined value, and wherein an actual serial number of each of the at least two of the plurality of printers is suppressed.

* * * * *

UNITED STATES PATENT AND TRADEMARK OFFICE
CERTIFICATE OF CORRECTION

PATENT NO. : 7,755,787 B2  Page 1 of 1
APPLICATION NO. : 11/119238
DATED : July 13, 2010
INVENTOR(S) : Yaag Whuang Eng et al.

It is certified that error appears in the above-identified patent and that said Letters Patent is hereby corrected as shown below:

In column 6, line 7, in Claim 4, after "serial" insert -- number --.

In column 6, line 13, in Claim 5, after "report" insert -- a --.

In column 6, line 37, in Claim 8, delete "devices;" and insert -- devices: --, therefor.

In column 7, line 14, in Claim 15, delete "devices;" and insert -- devices: --, therefor.

In column 7, line 27, in Claim 17, after "the" insert -- at least two of the --.

Signed and Sealed this

Twenty-eighth Day of September, 2010

David J. Kappos
*Director of the United States Patent and Trademark Office*